(12) United States Patent
Zaltzman et al.

(10) Patent No.: US 10,825,117 B2
(45) Date of Patent: Nov. 3, 2020

(54) CONTENT RECOMMENDATION AND DISPLAY BASED ON GEOGRAPHIC AND USER CONTEXT

(71) Applicant: SKYSCANNER LIMITED, London (GB)

(72) Inventors: Ori Zaltzman, Menlo Park, CA (US); Travis Katz, Menlo Park, CA (US)

(73) Assignee: SKYSCANNER LIMITED, London (GB)

( * ) Notice: Subject to any disclaimer, the term of this patent is extended or adjusted under 35 U.S.C. 154(b) by 514 days.

(21) Appl. No.: 15/452,418

(22) Filed: Mar. 7, 2017

(65) Prior Publication Data
US 2018/0260916 A1  Sep. 13, 2018

(51) Int. Cl.
*G06Q 50/14* (2012.01)
*G06F 16/9537* (2019.01)
*G06Q 30/06* (2012.01)

(52) U.S. Cl.
CPC ........ *G06Q 50/14* (2013.01); *G06F 16/9537* (2019.01); *G06Q 30/0631* (2013.01); *G06Q 30/0643* (2013.01)

(58) Field of Classification Search
USPC ........................................................ 705/26
See application file for complete search history.

(56) References Cited

U.S. PATENT DOCUMENTS

| | | | |
|---|---|---|---|
| 2015/0220544 A1* | 8/2015 | Zaltzman | G06F 16/9537 707/722 |
| 2016/0360382 A1* | 12/2016 | Gross | G06F 3/04883 |
| 2016/0366546 A1 | 12/2016 | Yamasaki et al. | |
| 2018/0260916 A1* | 9/2018 | Zaltzman | G06Q 50/14 |

* cited by examiner

*Primary Examiner* — Garcia Ade
(74) *Attorney, Agent, or Firm* — Saul Ewing Arnstein & Lehr LLP (57) ABSTRACT

A travel system generates and provides content recommendations to a user of the travel system. The travel system identifies content categories that are likely to be of interest to the user of the travel system based on context characteristics of the user such as whether the user is a traveler or a local at a particular geographic location. Additionally, the travel system further identifies content objects (e.g., attractions, activities, events, restaurants, businesses, and the like) for each identified content category that are likely to be of interest to the user based on characteristics of each content object. The identified content categories and content objects are provided as content recommendations for display to a user of the travel system, enabling a user to quickly navigate between content categories and content objects within each content category.

17 Claims, 6 Drawing Sheets

CONTENT RECOMMENDATION AND DISPLAY BASED ON GEOGRAPHIC AND USER CONTEXT

BACKGROUND

This invention relates to data processing, and more specifically to the selection of content for display to a user in a travel information system and database.

Travel systems are often designed to enable users to research and plan for travel. For instance, a user can select a destination that the user is interested in visiting, and can discover cities, hotels, restaurants, and tourist attractions within the location. Therefore, a travel system provides travel content to a user. However, conventional travel systems, in selecting content for display to users, do not take full advantage of relevant user information, resulting in the display of less-relevant content, and a sub-optimal experience for the users.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A travel system generates and provides personalized and geographically proximate content recommendations to a user of the travel system in order to inform the user of content objects (e.g., activities, restaurants, attractions, hotels, gatherings, bars, landmarks, a public event and the like) that are likely to be of interest to the user. In various embodiments, the request for personalized content recommendations is sent by a client device to the travel system. The travel system provides content recommendations to the user for display within a display interface of the client device.

Content recommendations provided by the travel system include both content categories (e.g., "Breakfast and Brunch Spots", "Parks", etc.) as well as content objects (e.g., restaurants, activities, attractions, or other entities). The travel system identifies content categories that are likely to be of interest to the user of the travel system based on context characteristics of the user. For example, context characteristics of a user may include whether the user of the travel system is a visitor or a local in the user's current geographical location. Additional context characteristics of a user include the current time of day, current day of the week, a current or future weather forecast, a current or future environmental condition (e.g., temperature, air quality, humidity), preferences associated with similar users of the travel system, characteristics of the location (e.g., whether the user is in a dense urban area or a less dense rural or semi-rural area, or the existence of physical or geopolitical boundaries), and the like. For each content category, the travel system additionally identifies content objects associated with the content category that are likely to be of interest to the user of the travel system based on characteristics of the content object. A content object may be an attraction, activity, event, restaurant, business, and the like. A content object characteristic for a content object can include a distance from the user's current geographical location to the location of the content object, a current status of the content object (e.g., currently open/closed), suitability of the content object based on a context characteristic (e.g., current weather or time of day), popularity of the content object based on user reviews, an ease or availability of transportation to the content object, preferences of similar users of the travel system, and the like. In various embodiments, the travel system may score and rank each content category and each content object within a selected set of content categories, and may provide the ranked content recommendations for display within a display interface on the client device.

The client device receives the content recommendations and displays the content recommendations to the user of the travel system within a display interface. In various embodiments, the most prominently displayed content category displayed by the client device are determined by the travel system as likely to be of greatest interest to the user of the travel system in view of the context characteristics of the user. Additionally, the content object most prominently displayed within each content category is determined by the travel system as most likely to be of greatest interest to the user of the travel system in view of the characteristics of the content object. As such, the user of the travel system can receive and view relevant content recommendations within one or more relevant content categories.

System Environment

Figure 1:
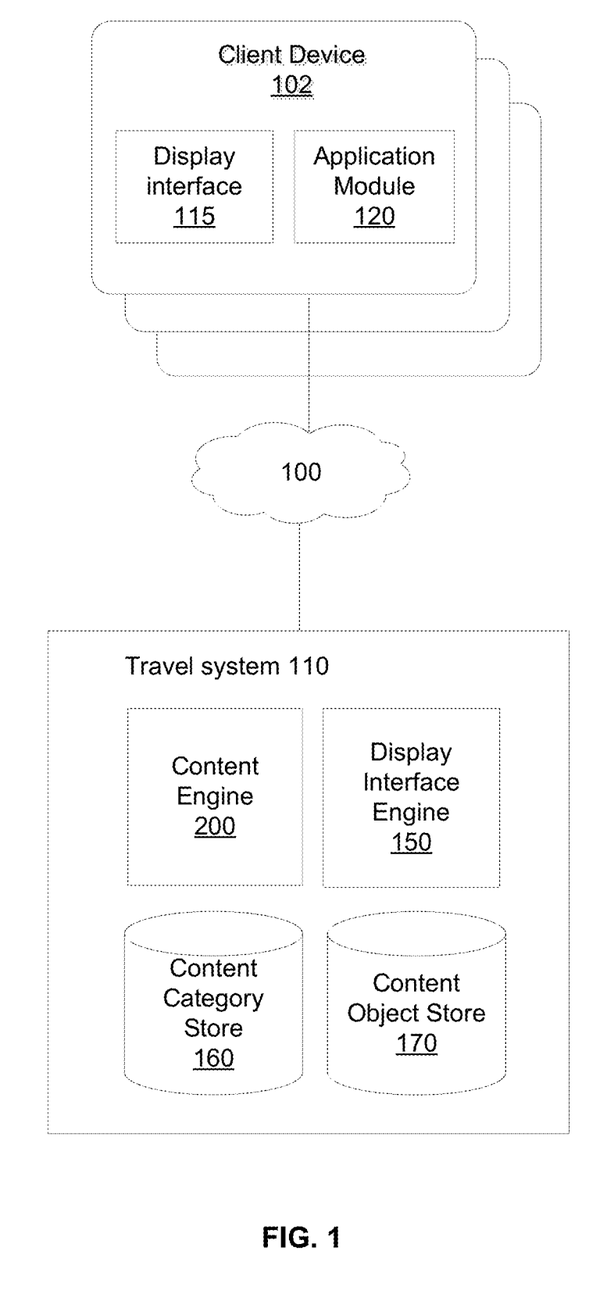
FIG. 1 illustrates a system environment for providing content recommendations within a travel system, in accordance with one embodiment.

FIG. 1 illustrates a system environment for providing content recommendations within a travel system, in accordance with one embodiment. The system environment includes a travel system 110 communicatively coupled to one or more client devices 102 through a network 100. It should be noted that in other embodiments, the system environment of FIG. 1 can include fewer, additional, or different components than illustrated herein.

The network 100 facilitates data transfer (e.g., communication) between the one or more client devices 102 and the travel system 110. The network 100 may be any wired or wireless local area network (LAN) and/or wide area network (WAN), such as an intranet, an extranet, or the Internet. In various embodiments, the network 100 uses standard communication technologies and/or protocols. Examples of technologies used by the network 100 include Ethernet, 802.11, 3G, 4G, 802.16, or any other suitable communication technology. The network 100 may use wireless, wired, or a combination of wireless and wired communication technologies. Examples of protocols used by the network 100 include transmission control protocol/Internet protocol (TCP/IP), hypertext transport protocol (HTTP), simple mail transfer protocol (SMTP), file transfer protocol (TCP), or any other suitable communication protocol. Additionally or alternatively, specialized application software that runs natively on a client device 102 is used as an interface to connect to the network 100. For example, a client device 102 may communicate with the network 100 through a software application previously installed on the client device 102.

A client device 102 is accessed by a user of the travel system 110. Examples of client devices 102 include a personal computer (PC), a desktop computer, a laptop computer, a notebook, a tablet PC, and the like. Further examples of client devices 102 include mobile devices, such as a personal digital assistant (PDA), a mobile telephone, a smartphone, a wearable technology (e.g., smart watch or smart glasses) or any other suitable computing device. The client device 102 can execute an operating system, for example, a Microsoft Windows-compatible operating system (OS), Apple OS X, Android, and/or a Linux distribution.

As depicted in FIG. 1, the client device 102 includes a display interface 115 and an application module 120 that enables the user of the travel system 110 to communicate with and receive information from the travel system 110. The application module 120 includes computer program code configured to be executed by a processor of the client device 102 to execute operations associated with an application installed on the client device 102. For example, an operation may be the opening of the application on the client device 102, the display of content object recommendations within the display interface 115, and the navigation between displayed content categories and content objects within each content.

In various embodiments, application module 120 may execute an application displaying a user interface, for example, an internet browser for allowing the user of the client device 102 to interact with the travel system 110. In other embodiments, the application module 120 executes a native application installed on the client device 102 that is associated with the travel system 110. In doing so, the user of the client device 102 may provide login credentials (e.g., a travel system user ID, password) to the travel system 110 through the application to authenticate an identity of the user and to access personalized content received from the travel system 110.

In various embodiments, the application module 120 provides a request to the travel system 110 to receive content recommendations. The request may be sent by the application module 120 in response to an action on the client device 102. For example, when the application module 120 launches the application associated with the travel system 110, the application module 120 can be configured to automatically send the request to the travel system 110. Likewise, the application module 120 can request content recommendations in response to a user input, such as selection of an option within the application associated with content recommendations. In response, the application module 120 can receive content recommendations from the travel system 110 and can present the received content recommendations to the user through the display interface 115 of the client device 102.

The display interface 115 is configured to present information to and receive input from a user of the client device 102. In some embodiments, the display interface 115 is a component of a travel system software application, while in other embodiments, the display interface comprises an operating system or other software API accessed and used by the travel system 100. The display interface 115 displays information such as content recommendations received from the travel system 110 within one or more interface portions. Additionally, the display interface 115 receives input (e.g., a user input or user selection) through input devices (e.g., a touchscreen) of the client device 102. In various embodiments, a user input may be a scroll gesture received on a client device touchscreen. In response, the display interface 115 may scroll all or a portion of a displayed interface (e.g., may scroll between presented content categories, or may scroll content objects within a presented content category).

The travel system 110 provides content recommendations for a user of the travel system that are displayed through the display interface 115 of the client device 102. In various embodiments, the content recommendations provided by a travel system 110 are uniquely tailored for each user. To do so, the travel system 110 may maintain information associated with each user such as the user's interests, a user's biographical information (e.g., name, age, hometown, birthplace), content the user has previously viewed or interacted with, user uploaded images, places a user has visited, user provided recommendations, and the like. Additionally, the travel system 110 may categorize users of the travel system 110 into various groups with one or more common interests (e.g., travel system characteristics), hereafter referred to as "tribes" of the travel system 110. Further details regarding the creation and the categorization of users of the travel system 110 into various tribes are described in U.S. application Ser. No. 14/171,521, which is hereby incorporated by reference.

To generate and provide content recommendations, the travel system 110 includes a content engine 200, a display interface engine 150, a content category storage module 160, and a content object storage module 170. The content engine 200 generates content recommendations for a user of the travel system 110. For example, the content engine 200 identifies one or more content categories stored in the content category store 160 that are likely of interest to the user of the travel system 110. Examples of content categories may include, but are not limited to: a little bit of history (content objects with particular historical relevance), backpacker favorites (content objects popular with users that enjoy backpacking), beat the heat (content objects that are appropriate when the temperature is high), breakfast and brunch spots, budget friendly dining, date night ideas, drink spot ideas, escape the gloom (content objects that are appropriate for adverse weather), events this week (event-type content objects occurring this week), fun with kids (kid-friendly content objects), get artsy (content objects that are popular with users that enjoy the arts), get caffeinated (coffee-related content objects), get outside (content objects involving the outdoors), get tipsy (content objects that are alcohol related), get your adventure on (content objects that are popular with adventurous users), go to bed (content objects associated with overnight stays), grab a drink, grab coffee & relax, grab dinner, happy hour o'clock, late night bites, lesbian/gay/bisexual/transgender (LGBT) friendly, local favorites (content objects popular with locals), lunch spots, luxury dining spots, nearby destinations (content objects within a threshold distance to the user), new in town (content objects that have opened within a recent threshold amount of time), outdoorsy friendly (content objects that accommodate people that enjoy the outdoors), rate it! (content objects that are seeking user feedback), restaurant ideas, satisfy your sweet tooth (content objects that are popular with users that enjoy sweet foods), something sweet (content objects for users seeking to make a romantic gesture), stay dry (content objects that are appropriate for inclement weather), stay warm (content objects that enable users to warm up), staycation! (content objects that are local to the user's location and popular with locals), things to do (content objects that give users ideas for activities), time to relax (content objects that are popular with users that enjoy relaxing activities), top cities, top drinks & nightlife, top hotels, top regions, top restaurants, top things to do, trendy dining, vegetarian friendly food, weekend getaways, and the like.

For each identified content category, the content engine 200 further identifies one or more content objects associated with the content category that are also likely to be of interest to the user of the travel system 110. Examples of content objects include a specific activity, a restaurant, an attraction, a gathering, a landmark, a public event, and the like. Each content object may have associated information (e.g., identifying information, operating hours, price range, ratings, descriptions (e.g., appropriate attire, reservations accepted, how busy the location is) and the like) that are stored in the content object store 170. Additionally, information associated with each content object also includes an identification of one or more content categories with which the content object is associated. For example, for a restaurant that serves coffee and brunch or breakfast, the travel system 110 may further store an identification of the "breakfast and brunch spots" and/or the "get caffeinated" content categories in association with the restaurant.

The display interface engine 150 provides an interface that includes the content recommendations to be presented through the display interface 115 of the client device 102. As used hereafter, content recommendations refer to both content categories and content objects associated with each content category. For example, reference is hereby made to FIG. 3A, which depicts an example interface 300 displayed by the display interface 115 of the client device 102. Generally, the interface 300 may include information pertaining to various context characteristics of a user (e.g., geographical location 302, time of day or week 306, and weather 304). Multiple content categories 310 and 315 may be displayed in interface portions of the interface 300 as horizontally scrollable categories. In the embodiment illustrated in FIG. 3A, content category 310 ("Breakfast and Brunch Spots") includes a set of content objects (e.g., 330, 335, and others not shown), whereas content category 315 ("Events this Week") includes a second set of content objects (e.g., 340, 345, and others not shown). Each content object may display additional information identifying one or more tribes 333, 337 (e.g., vegetarian, foodies, families) of users of the travel system 110 for whom the content object is recommended.

Figure 3A:
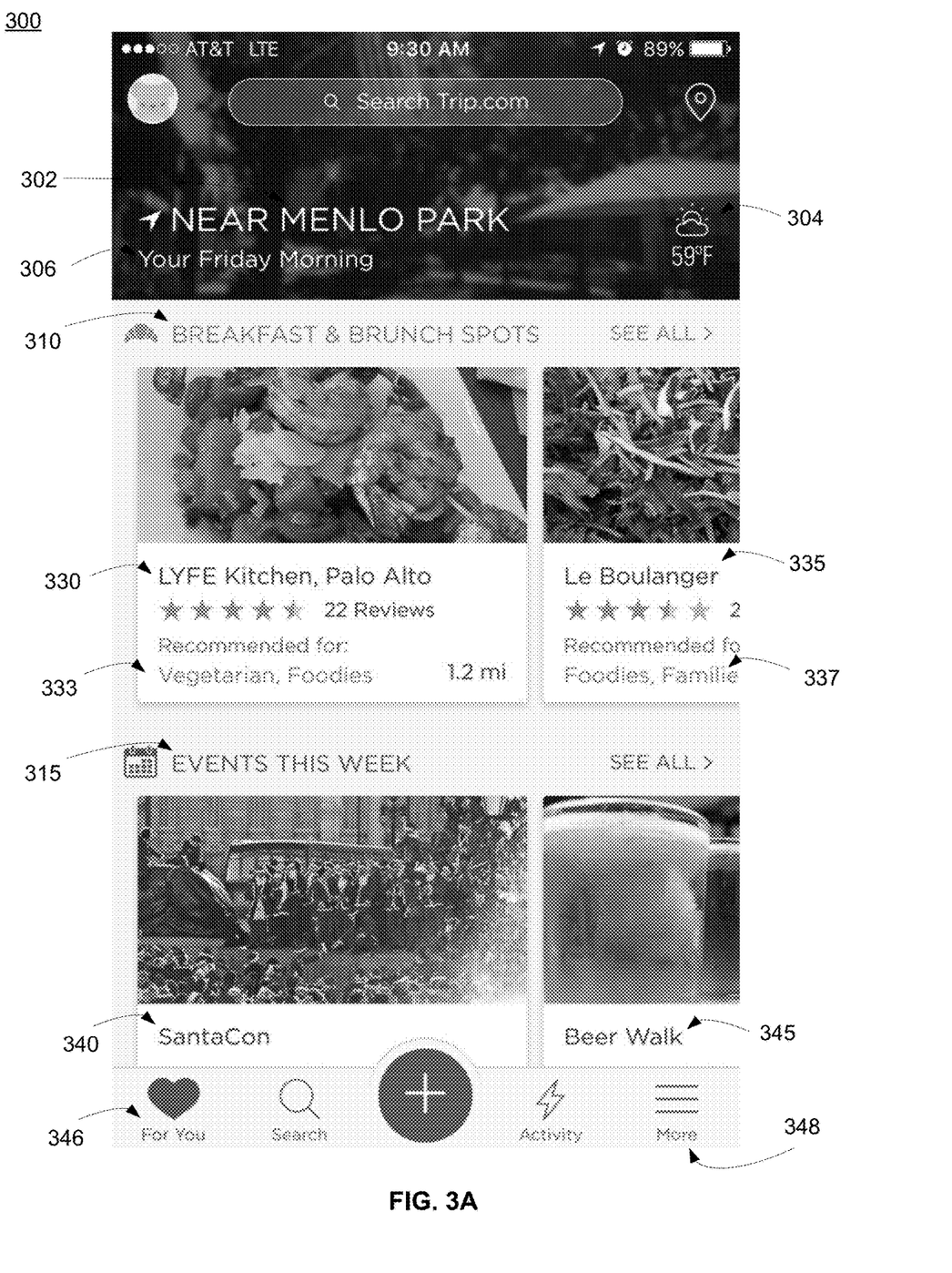
FIGS. 3A and 3B each depict an example display interface of the travel system, in accordance with one embodiment.

In various embodiments, the display interface engine 150 provides instructions to the client device 102 as to how the content recommendations are to be displayed by the display interface 115 of the client device 102. Therefore, the client device 102 can update the display interface 115 accordingly. For example, the display interface engine 150 provides content categories, content objects, and instructions that specify where each content category and content object is to be placed on the interface 300 (or a ranking of content categories and content objects within each category and an instruction to display the content categories and content objects in ranked order). Referring to FIG. 3A, the display interface engine 150 may provide, to the client device 102, an instruction that the "Breakfast and Brunch Spots" content category 310 is located in a first interface portion of the interface 300. Additionally, the display interface engine 150 may provide, to the client device 102, an instruction that the "LYFE Kitchen, Palo Alto" content object 330 is to be placed at a first location within the first interface portion of the interface 300. In various embodiments, the "Breakfast and Brunch Spots" content category 310 and the "LYFE Kitchen, Palo Alto" content object 330 are respectively the content category and content object that the travel system 110 has identified to likely be the most relevant to the user of the travel system 110.

Selecting Content Recommendations

Figure 2:
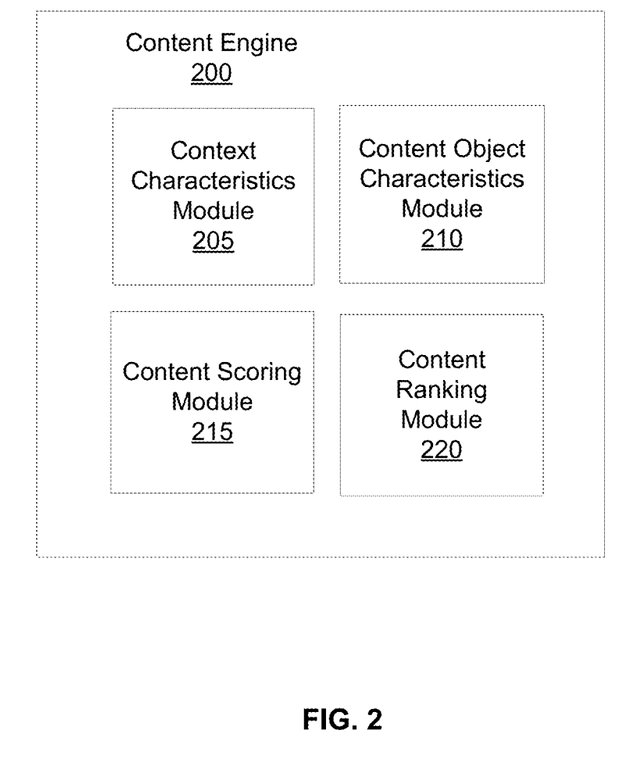
FIG. 2 is a block diagram of a content engine of the travel system, in accordance with one embodiment.

FIG. 2 is a block diagram of a content engine of the travel system, in accordance with one embodiment. The content engine 200 generates content recommendations for a user of the travel system 110 based on characteristics including context characteristics of the user and characteristics associated with content objects (e.g., content object characteristics). The content engine 200 includes a context characteristics module 205, a content object characteristics module 210, a content scoring module 215, and a content ranking module 220.

The context characteristics module 205 accesses various context characteristics of a user that are used in identifying the content categories that are to be presented to the user. Examples of context characteristics of the user include, but are not limited to: the user's current geographical location, whether the user is a traveler or a local based on the user's current geographical location, a current time of day, a current day of week, a current or future weather forecast, a current or future environmental condition (e.g., temperature, air quality, humidity), preferences associated with additional users of the travel system 110 in common tribes or with common characteristics as the user of the travel system 110, and the like.

The content object characteristics module 210 accesses various content object characteristics that are used in determining the content objects of selected content categories that are to be presented to the user of the travel system 110. Examples of content object characteristics include, but are not limited to: the user's current distance to the content object, a current status of the content object (e.g., open or closed), an ease or availability of transportation to the content object, preferences of additional users in a common tribe or with common characteristics as the user of the travel system 110, suitability of the content object based on a context characteristic (e.g., current weather or time of day), popularity of the content object based on user reviews, and the like.

The content scoring module 215 scores content categories and content objects within each content category based on the context characteristics of the user and content object characteristics, respectively. As such, the scored content categories and scored content objects within each content category can be provided to the content ranking module 220 in order to generate the content recommendations for a user of the travel system 110.

The content scoring module 215 may assign a weight to each context characteristic that is a measure of the importance of that context characteristic to the user in relation to other context characteristics of the user. One example ranking of context characteristics of the user includes: 1) whether the user is a traveler or a local based on the current geographical location, 2) a current time, 3) a current or future weather forecast, and 4) preferences of additional users in a common tribe of the travel system 110. In another embodiment, the content scoring module 215 trains a machine learning model to assign and update weights assigned to each context characteristic based on actions taken by users within the travel system 110. For example, if a content category is presented to users of the travel system 110 but performs unexpectedly (e.g., exceeds expected interest or receives subpar interest from users), the machine learning model is trained to update the weight assigned to each context characteristic to reflect the increase or decrease in interest.

The content scoring module 215 may further determine a strength of association between each content category and each context characteristic of the user. A strength of association represents a measure of how relevant a content category is for a user of the travel system 110 associated with a particular context characteristic of the user. For example, if the context characteristic of the user identifies that the user of the travel system 110 is a traveler at a current geographical location, the content scoring module 215 may assign a high strength of association to a content category that is popular to travelers (e.g., top restaurants) and a low strength of association to a content category that is popular with locals (e.g., staycation!). Similarly, if the context characteristic of the user is a time of day in the morning (e.g., 8 AM), then the content scoring module 215 assigns a high strength of association to a content category that is relevant for that time of day (e.g., "get caffeinated" or "breakfast and brunch spots") whereas less relevant content categories (e.g., "late night bites" or "go to bed") are assigned a low strength of association.

The content scoring module 215 scores each content category based on the strength of association between the content category and each context characteristic of the user and associated context characteristic weight. The score for each content category represents an overall likely interest level of a user of the travel system 110 for that content category. A higher assigned strength of association and a greater weight for a context characteristic of the user results in a higher score for the content category in comparison to a lower assigned strength of association and/or a lower assigned weight (assuming all other variables are held constant). For example, the content scoring module 215 can determine a product of the assigned weight and the assigned strength of association for each context characteristic and sum all products to generate a score for the content category. The content scoring module 215 provides the score of each content category to the content ranking module 220.

For each content category, the content scoring module 215 further scores content objects within each content category. To identify content objects associated with each content category, the content scoring module 215 accesses information from the content object store 170 that identifies the content objects associated with each content category.

The content scoring module 215 scores each content object based on content object characteristics. In various embodiments, each content object characteristic is assigned a weight that indicates a relative importance of the content object characteristic to a user or to the content category associated with the content object characteristic in comparison to other content object characteristics. An example ranking of content object characteristics includes: 1) the user's current distance to a location associated with the content object, 2) a current status of the content object (e.g., open or closed), 3) an ease of transportation to the content object, and 4) preferences of additional users in a common tribe or with common characteristics as the user of the travel system 110.

Additionally, the content scoring module 215 determines a measure of interest for each content object characteristic. A measure of interest represents how likely a user of the travel system 110 is interested in a content object associated with the content object characteristic.

For example, if the content object characteristic is the user's current distance to a location associated with the content object, the measure of interest determined by the content scoring module 215 for the content object may scale inversely according to the distance. This reflects the fact that a user of the travel system 110 may be less interested in a content object that is farther in distance from the user. In various embodiments, the content scoring module 215 may compare the user's current distance to a location associated with the content object to a threshold distance. If the user's current distance to the content object is greater than the threshold distance, the content scoring module 215 assigns a low measure of interest for that content object.

If the content object characteristic is a current status of the content object, the content scoring module 215 may employ a scoring system such that if the content object is currently open, the content scoring module 215 assigns a first measure of interest. On the other hand, if the content object is currently closed, the content scoring module 215 assigns a second measure of interest that is lower than the first measure of interest. In other embodiments, the content scoring module 215 may further consider the time remaining until a content object is to open or close. For example, if the content object is to open or begin within a threshold amount of time (e.g., 1 hour, 30 minutes, or the like), the content scoring module 215 may assign a higher measure of interest in comparison to a measure of interest if the content object is closed for a longer duration of time. Alternatively, if the content object is to close or end within a threshold amount of time, the content scoring module 215 can assign a lower measure of interest in comparison to a measure of interest if the content object is to be open for a longer duration of time.

If the content object characteristic is the ease of transportation to the content object, the content scoring module 215 may consider various factors including ease of accessing public transportation to the content object, current traffic conditions to the content object, overall travel time to the content object, and the like. The measure of interest for the "ease of transportation" content object characteristic decreases as the difficulty to access or arrive at the content object increases.

If the content object characteristic refers to the preferences of additional users in a common tribe of the travel system 110 as the user, or with one or more characteristics in common with the user, the content scoring module 215 can determine a measure of interest for the content object based on the actions of the additional users in the common tribe. For example, if the user of the travel system 110 identifies as a vegetarian and is in the vegetarian tribe of the travel system 110, the content scoring module 215 identifies the actions of the additional users that are also in the vegetarian tribe. If the additional users in the vegetarian tribe often frequent a content object and consistently post positive reviews regarding the content object, the content scoring module 215 assigns a high measure of interest which reflects that the content object would likely be of interest to the user of the travel system 110.

In various embodiments, the content scoring module 215 determines, for each content category, a score for each content object associated with the content category based on the assigned weight and assigned measure of interest for each content object characteristic. The score represents an overall likelihood that the user of the travel system 110 will be interested in the content object. A higher assigned measure of interest and a higher assigned weight for a content object characteristic results in a higher score for the content object in comparison to a lower assigned measure of interest and/or a lower assigned weight (assuming all other variables are held constant). The content scoring module 215 provides the score for each content object to the content ranking module 220.

The content ranking module 220 ranks the content categories and content objects based on their respective scores and determines which content recommendations are to be provided to a user of the travel system 110. In various embodiments, the content ranking module 220 identifies and provides a threshold number of the top ranked content categories. Furthermore, for each of the top ranked content categories, the content ranking module 220 identifies a threshold number of the top ranking content objects associated with the content category. In one embodiment, if a ranked content category does not include a threshold number of content objects, the content category itself is removed from the ranking to prevent the presentation of a content category that has an inappropriately low number of content objects.

In various embodiments, the content ranking module 220 sets a threshold content category score, such that if a score of a content category is not above the threshold content category score, the content category is not included in the ranking. Similarly, the content ranking module 220 sets a threshold content object score, such that if a score of a content object is not above the threshold content object score, the content object is not included in the ranking.

The content ranking module 220 may generate a list of ranked content categories as well as ranked content objects within each ranked content category. The ranked content categories and ranked content objects are provided to the display interface engine 150 of the travel system 110 for display to the user.

Example Display Interfaces of Content Recommendations

Figure 3B:
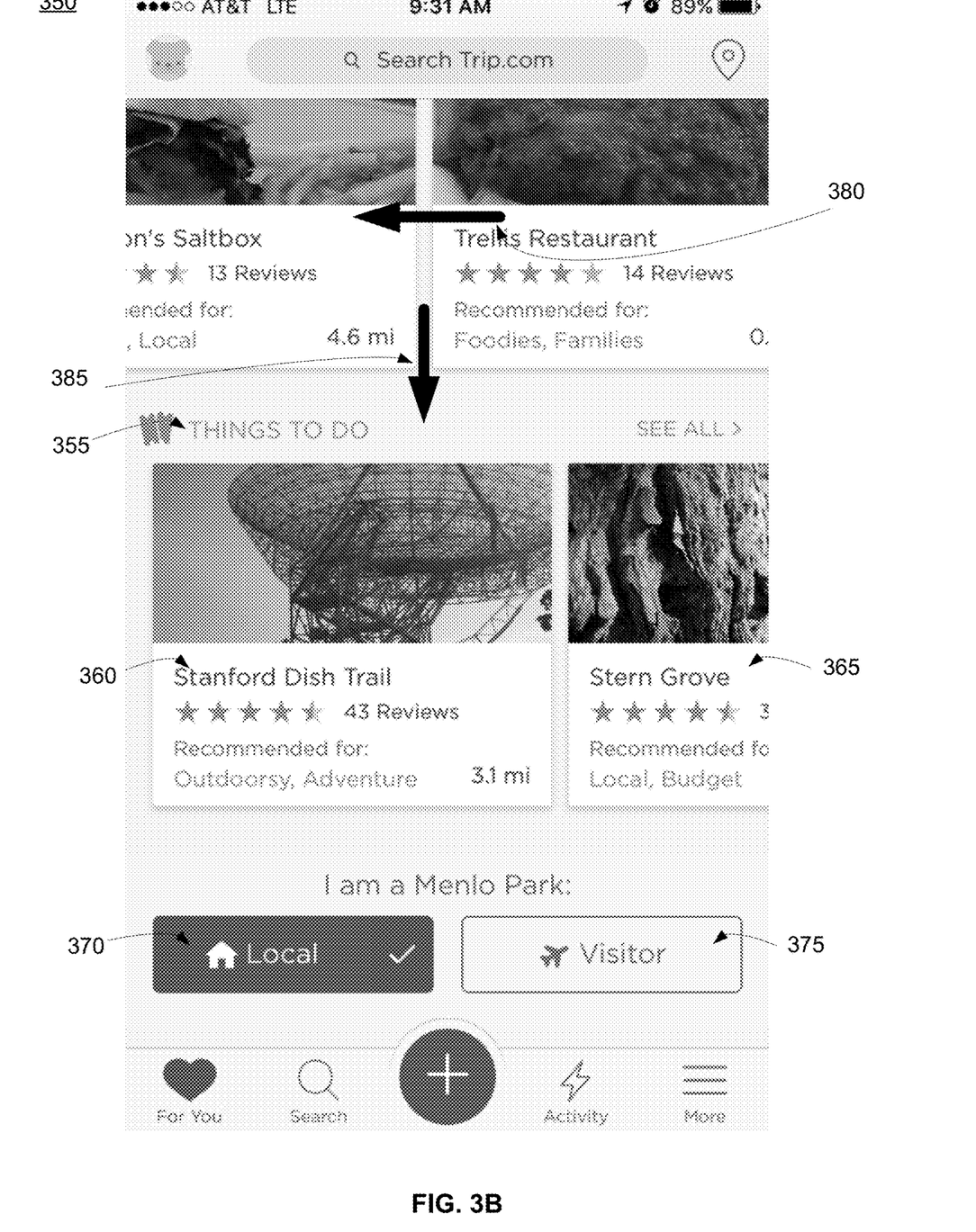

FIGS. 3A and 3B each depict an example interface 300 of the travel system 110, in accordance with one embodiment. As previously described, the interface 300 depicted in FIG. 3A includes information associated with various context characteristics of the user 302 (location), 304 (weather conditions), and 306 (time). Additionally, the interface 300 includes interface portions that each identify a content category 310 and 315, and content objects 330, 335, 340, and 345 each displayed within a content category. More specifically, FIG. 3A depicts content objects "LYFE Kitchen, Palo Alto" 330 and "Le Boulanger" 335 which are categorized in the content category "Breakfast and Brunch Spots" 310.

In various embodiments, the interface 300 depicted in FIG. 3A serves as the landing page that is displayed through a display interface 115 of the client device 102. In other words, when the application module 120 of the client device 102 executes the application associated with the travel system 110, the travel system 110 provides content recommendations such that the first interface displayed through the display interface 115 of the client device 102 is the interface 300 as depicted in FIG. 3A.

Each content recommendation is presented in the interface 300 according to a likelihood that the user of the travel system 110 would be interested in the recommendation. For example, the most prominently presented content category (e.g., "Breakfast and Brunch Spots" 310) is the content category that is likely to be of highest interest to the user of the travel system 110 based on the context characteristics of the user. Additionally, within each content category, the most prominently presented content object (e.g., "LYFE Kitchen, Palo Alto" 330) is the content object that is likely to be of highest interest to the user of the travel system 110. The additional content categories (e.g., "Events this Week" 315 and additional content categories not currently shown in FIG. 3A) are also included in the interface 300 at less prominent positions (e.g., below content category 310) given that a user of the travel system 110 is determined to be less likely to be interested in the additional content categories than in the content category 310. Similarly, additional content objects (e.g., "Le Boulanger" 335 and additional content objects not currently shown in FIG. 3A) are also included in the interface 300 at less prominent positions (e.g., to the right of content object 330) given that the user of the travel system 110 is determined to be less likely to be interested in the additional content objects than in the content object 330.

In various embodiments the interface 300 is further configured to display a different interface in response to a user input. As one example, the interface 300 further includes additional selectable options such as "For You" 346, "search," "activity," and "more" 348 options. When the interface 300 receives an input on a selectable option, the interface 300 is configured to display a corresponding interface (e.g., a search interface, an activities interface, a more options interface).

The interface 300 can be updated in response to a scrolling input. In one embodiment, the scrolling input is a downward scrolling gesture 385 received through the display interface 115 of the client device 102. Therefore, as depicted in FIG. 3B, a second example interface 350 may be displayed. The second example interface 350 differs from the interface 300 depicted in FIG. 3A in that the second example interface 350 displays a different set of content recommendations. As specifically depicted in FIG. 3B, the additional content recommendations include a different content category 355 (e.g., "Things to Do") as well as content objects (e.g., "Stanford Dish Trail" 360 and "Stern Grove" 365) of that content category 355. In various embodiments, the content categories displayed in FIG. 3B (e.g., 355) are ranked lower than the content categories depicted in FIG. 3A (e.g., 310 and 315).

In another embodiment, the scrolling input is a horizontal scrolling gesture 380 within an interface portion. For example, the horizontal scrolling gesture 380 causes the interface to correspondingly scroll content objects displayed within a content category to more prominently display a different content object (e.g., "Trellis Restaurant"). Similarly, a leftward horizontal scrolling gesture on an interface portion that identifies the "Things to Do" 355 content category causes the second interface 350 to more prominently display the "Stern Grove" 365 content object as opposed to the "Stanford Dish Trail" 360 content object.

In various embodiments, as shown in FIG. 3B, the second interface 350 also includes a selectable option that identifies whether the user of the travel system 110 is a local or a visitor of the current geographical location (e.g., Menlo Park) of the user. The travel system 110 may use the local/visitor identification provided by the user as a context characteristic of the user in identifying the content recommendations to provide to the user of the travel system 110.

Figure 4A:
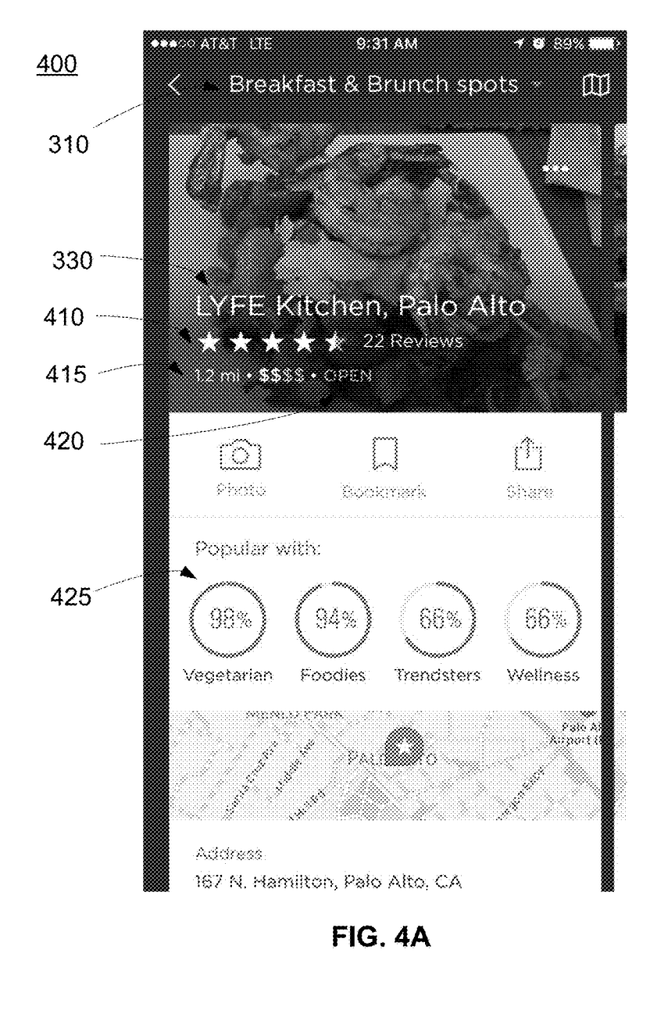
FIGS. 4A and 4B depict example display interface navigations, in accordance with one embodiment.

The interface 300 and the second interface 350 are each configured to provide additional information regarding a specific content object. For example, FIG. 4A depicts an example display interface navigation, in accordance with one embodiment. In various embodiments, a content object interface 400 is presented on a display interface 115 of the client device 102 in response to receiving an input such as a touch selection gesture of a specific content object. For example, referring to the interface 300 depicted in FIG. 3A, a touch selection gesture received on the content object 330 invokes the content object interface 400 depicted in FIG. 4A.

Referring to FIG. 4A, the content object interface 400 may include an identification of the content object (e.g., "LYFE Kitchen, Palo Alto" 330) as well as the content category that the content object is associated with (e.g., "Breakfast and Brunch Spots" 310). Additionally, the content object interface 400 displays various content object characteristics including overall feedback 410 of the content object, a distance 415 to the content object from the location of the user, a current status 420 of the content object, and measures of popularity 425 of the content object amongst various tribes of the travel system 110.

Figure 4B:
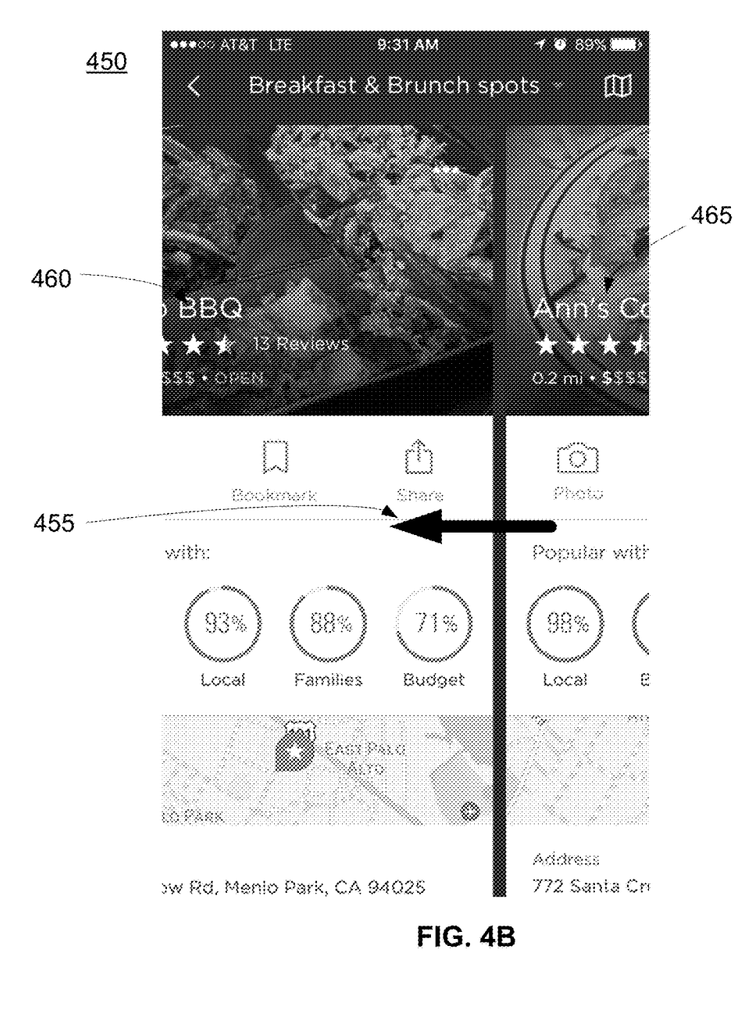

The content object interface 400 is further configured to display a second content object interface in response to a user input. For example, FIG. 4B depicts the transitioning 450 from a first content object interface that includes information of a first content object to a second content object interface that includes information of a second content object. The user input may be a left, horizontal scrolling gesture provided by a user of the travel system 110 on the client device 102. Therefore, the identification of the content object 460 and other associated information is replaced by an identification of the second content object 465 and information corresponding to the second content object. In various embodiments, the second content object 465 may be the content object that is ranked immediately after the first content object 460 within a content category. Furthermore, additional content object interfaces can be displayed in response to additional left, horizontal scrolling gestures, each additional content object interface corresponding to a successively lower ranked content object that is associated with the content category 310.

Process of Selecting and Displaying Content Recommendations

Figure 5:
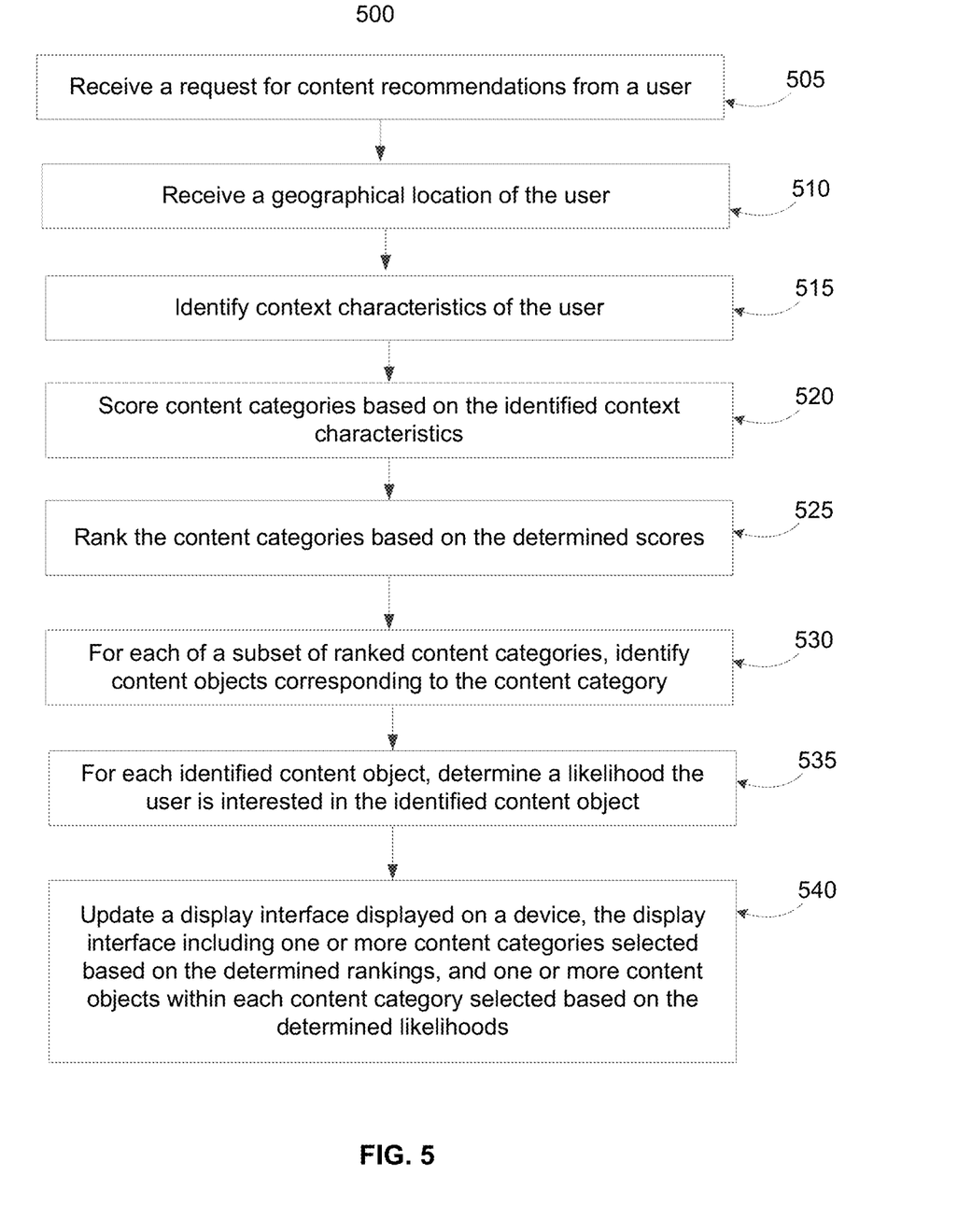
FIG. 5 is a flowchart of a process for generating content recommendations for display within a display interface of a client device, in accordance with one embodiment.

FIG. 5 is a flowchart of a process for generating content recommendations for display within a display interface 115 of a client device 102, in accordance with one embodiment. The travel system 110 receives 505 a request for content recommendations for a specific user of the travel system 110 and also receives 510 the user's geographical location. The travel system 110 identifies 515 context characteristics of the user such as a location of the user, whether the user is local or traveling, the current or future weather forecast at the location, the current time of day at the location, and the current day of the week at the location, characteristics of the location (e.g. density of points of interest, existence of physical or geopolitical boundaries), and specific characteristics of the user (e.g., the user's tribes, implicit interests). Using these identified context characteristics of the user, the travel system 110 scores 520 various content categories, each score indicative of how likely the user of the travel system 110 is to be interested in the content category. In various embodiments, to calculate scores for each content category, the travel system 110 determines a strength of association between a content category and each context characteristic of the user, and calculates the score based on the determined strengths of association.

The travel system 110 ranks 525 the various content categories based on the determined scores. In various embodiments, a subset of the ranked content categories are selected based on the determined rankings. For each ranked content category from the subset of ranked content categories, the travel system 110 identifies 530 content objects that correspond to the content category. For each identified content object, the travel system 110 determines 535 a score representative of a user's likely level of interest in the identified content object based on characteristics of the content object and/or based on the context characteristics of the user.

The travel system 110 updates 540 a display interface that is displayed on a client device 102. The updated display interface includes at least one interface portion that identifies a content category and further includes a set of content objects that corresponds to the content category. In various embodiments, the most prominently placed content category (e.g., the top content category depicted in FIG. 3A) is the highest ranked content category. Similarly, the most prominently placed content object within a content category is the highest ranked content object for the user of the travel system 110. Therefore, the user of the travel system 110 can be provided with content recommendations that are highly relevant to the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for selecting content for display to a user in a travel system, and for displaying the selected content to the user, comprising the steps of:
   a server of the travel system receiving a request from a mobile device of the user for content recommendations;
   the server receiving, from the mobile device of the user, a location of the user;
   the server identifying a plurality of context characteristics of the user based on the location of the user;
   for each of a plurality of content categories, the server scoring the content category based on the identified plurality of context characteristics of the user;
   the server ranking the plurality of content categories based on the content category scores;
   for each of a subset of the plurality of content categories selected based on the content category rankings:
   the server identifying one or more content objects corresponding to the content category, each content object associated with a physical location within a threshold proximity of the location of the user; and
   for each identified content object, the server determining a likelihood that the user is interested in the identified content object based on one or more characteristics of the content object; and
   the server updating a display interface displayed by the mobile device of the user, the updated display interface comprising a plurality of interface portions such that each interface portion identifies a selected content category and displays a set of content objects corresponding to the selected content category and selected based on the determined likelihoods that the user is interested in the content objects.

2. The method of claim 1, wherein the plurality of context characteristics of the user comprises one or more of:
   an indication of whether the user lives within a threshold proximity of the location or is traveling;
   a current time of day;
   a current day of week;
   a current or future weather forecast;
   characteristics of the location; and
   a preference associated with an additional user of the travel system with one or more travel system characteristics in common with the user.

3. The method of claim 1, wherein the one or more characteristics of the content object comprises:
   a distance from the user to a location of the content object;
   a current status of the content object;
   a popularity of the content object;
   a suitability of the content object based on a context characteristic;
   one or more actions of an additional user of the travel system with one or more travel system characteristics in common with the user, the one or more actions performed in relation to the content object; and
   one or more available modes of transportation to the location of the identified content object.

4. The method of claim 1, wherein scoring the content category comprises determining a strength of association between the content category and each context characteristic of the user.

5. The method of claim 1, wherein the display interface is configured to scroll and display additional content in response to receiving a user scroll input on the display interface.

6. The method of claim 5, wherein the user scroll input comprises a vertical gesture, and wherein the displayed additional content comprises one or more additional interface portions each identifying a different selected content category.

7. The method of claim 5, wherein the user scroll input comprises a horizontal gesture within an interface portion, and wherein the displayed additional content comprises one or more different content objects corresponding to the selected content category identified by the interface portion.

8. The method of claim 1, wherein the set of content objects displayed within an interface portion comprises an above-threshold number of content objects.

9. The method of claim 1, wherein the display interface further comprises a selectable button that enables the user to indicate whether the user is a local of or a traveler to the location of the user.

10. The method of claim 1, further comprising:
    responsive to receiving a selection of a content object displayed in an interface portion, updating the display interface to display information comprising one or more of:
    an identification of the content object;
    images of the content object;
    information describing the content object; and
    an indication of a popularity of the content object within a set of users of the travel system.

11. A travel system comprising a server and a non-transitory computer readable medium, the server including a processor, the non-transitory computer readable medium including instructions that, when executed by the processor of the server of the travel system, cause the processor to:
    receive a request from a mobile device of a user for content recommendations;
    receive, from the mobile device of the user, a location of the user;
    identify a plurality of context characteristics of the user based on the location of the user;
    for each of a plurality of content categories, score the content category based on the identified plurality of context characteristics of the user;
    rank the plurality of content categories based on the content category scores;
    for each of a subset of the plurality of content categories selected based on the content category rankings:
    identify one or more content objects corresponding to the content category, each content object associated with a physical location within a threshold proximity of the location of the user; and
    for each identified content object, determine a likelihood that the user is interested in the identified content object based on one or more characteristics of the content object; and
    update a display interface displayed by the mobile device of the user, the updated display interface comprising a plurality of interface portions such that each interface portion identifies a selected content category and displays a set of content objects corresponding to the selected content category and selected based on the determined likelihoods that the user is interested in the content objects.

12. The travel system of claim 11, wherein the plurality of context characteristics of the user comprises one or more of:
   an indication of whether the user lives within a threshold proximity of the location or is traveling;
   a current time of day;
   a current day of week;
   a current or future weather forecast;
   characteristics of the location; and
   a preference associated with an additional user of the travel system with one or more travel system characteristics in common with the user.

13. The system of claim 11, wherein the one or more characteristics of the content object comprises:
   a distance from the user to a location of the content object;
   a current status of the content object;
   a popularity of the content object;
   a suitability of the content object based on a context characteristic;
   one or more actions of an additional user of the travel system with one or more travel system characteristics in common with the user, the one or more actions performed in relation to the content object; and
   one or more available modes of transportation to the location of the identified content object.

14. The system of claim 11, wherein scoring the content category comprises determining a strength of association between the content category and each context characteristic of the user.

15. The system of claim 11, the system including the mobile device of the user, wherein the display interface is configured to scroll and display additional content in response to receiving a user scroll input on the display interface.

16. The system of claim 15, wherein the user scroll input comprises a vertical gesture, and wherein the displayed additional content comprises one or more additional interface portions each identifying a different selected content category.

17. The system of claim 15, wherein the user scroll input comprises a horizontal gesture within an interface portion, and wherein the displayed additional content comprises one or more different content objects corresponding to the selected content category identified by the interface portion.

* * * * *